Patented Jan. 23, 1934

1,944,415

UNITED STATES PATENT OFFICE 1,944,415

PROCESS FOR MANUFACTURING BASIC ZINC CARBONATE

Martin J. Engberg, Highland Park, Ill.

No Drawing. Application November 16, 1929
Serial No. 407,675

9 Claims. (Cl. 23—61)

The present invention relates to an improved process for the manufacture of basic zinc carbonate, wherein the main object is the conversion of a basic oxygen-containing zinc compound other than a zinc salt, into basic zinc carbonate by treating the former while suspended in a solution of a zinc salt of a water-soluble organic acid with carbon dioxide. Specifically, the process consists in treating zinc oxide suspended in a dilute solution of acetic acid and/or zinc acetate with carbon dioxide under pressure.

There are no apparatus limitations on the process, but the same is most advantageously carried out in a closed container resistant to internal pressure, and made of a material resistant to the organic acid employed. An aluminum vessel is suggested as the most convenient for the purpose. This vessel may be provided with internal agitating means, and with the conventional means for loading and discharging the materials to be treated therein, and with gauges etc. Thus, for example, the cover of the vessel may be made removable, or be hinged, and the vessel may be connected with a source of carbon dioxide, which may conveniently be the commercially obtainable cylinders of liquid carbon dioxide. However, any suitable source of carbon dioxide, and means for pumping the same into the apparatus under pressure will be operative. It is believed that the workers skilled in the general chemical engineering arts will readily understand the manner of setting up a suitable apparatus for the purpose. For the general description of the apparatus it will be assumed that the same is provided with a cover capable of being tightly closed against the pressure produced in the apparatus by the introduction of carbon dioxide under pressure.

A convenient amount of zinc oxide or zinc hydroxide is placed within the reaction vessel and is therein mixed with sufficient water to bring it into a quite fluid suspension. A comparatively small amount of a water-soluble organic acid, such as acetic acid, formic acid, lactic acid or citric acid is then added. In place of the said acids, the normal zinc salts thereof may be substituted. The materials thus having been placed in the reaction vessel, the same is tightly closed by clamping down the cover thereof, or closing the charging-opening, as the case may be, and the mass contained in the vessel is stirred or agitated. Carbon dioxide gas is then admitted through a suitable pipe-connection, preferably building up, in the vessel, a pressure of from 20 to 30 lbs. gauge, per square inch. A convenient way of checking up on the amount of carbon dioxide admitted and consumed in the process is by noting the weight of a cylinder of liquid carbon dioxide which serves as the source of the carbon dioxide, and its loss in weight as the said gas enters the reaction vessel.

If acetic acid is used, the following reactions take place:

1. $ZnO + 2CH_3COOH \rightarrow Zn(CH_3COO)_2 + H_2O$
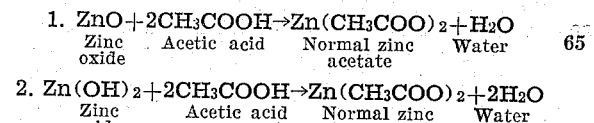

2. $Zn(OH)_2 + 2CH_3COOH \rightarrow Zn(CH_3COO)_2 + 2H_2O$
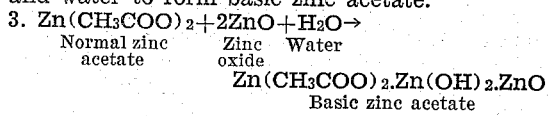

It will be noted that the only difference in the result from using zinc hydroxide instead of zinc oxide is that twice as much water is formed.

Normal zinc acetate is not precipitated by carbon dioxide. It reacts, however, with zinc oxide and water to form basic zinc acetate.

3. $Zn(CH_3COO)_2 + 2ZnO + H_2O \rightarrow$
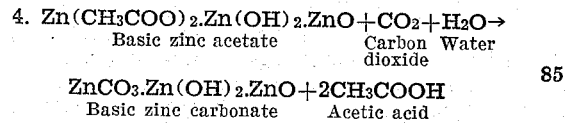
$Zn(CH_3COO)_2.Zn(OH)_2.ZnO$
Basic zinc acetate Basic zinc acetate readily reacts with carbon dioxide and water.

4. $Zn(CH_3COO)_2.Zn(OH)_2.ZnO + CO_2 + H_2O \rightarrow$
Basic zinc acetate  Carbon  Water
dioxide
$ZnCO_3.Zn(OH)_2.ZnO + 2CH_3COOH$
Basic zinc carbonate  Acetic acid By reaction 4, the acetic acid is regenerated and serves to repeat reactions 1, 3, and 4 with the zinc oxide, carbon dioxide and water, until all of the zinc oxide has been converted into basic zinc carbonate.

Uniting reactions 1 and 3, we have:

5. $3ZnO + 2CH_3COOH + H_2O \rightarrow$
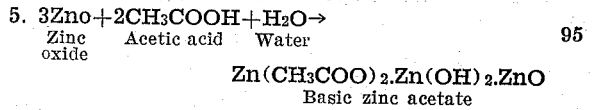
$Zn(CH_3COO)_2.Zn(OH)_2.ZnO$
Basic zinc acetate Uniting reactions 1, 3, and 4, we have:

6. $3ZnO + 2CH_3COOH + CO_2 + H_2O \rightarrow$
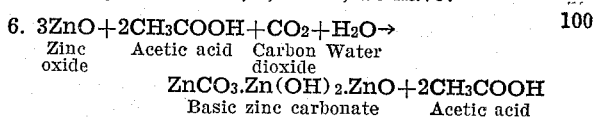
$ZnCO_3.Zn(OH)_2.ZnO + 2CH_3COOH$
Basic zinc carbonate  Acetic acid Basic zinc carbonate and acetic acid are the final products.

The normal zinc acetate acts as a carrier for an addition of zinc oxide and water. The resulting basic zinc acetate formed is the real carrier for the carbon dioxide. It also annexes still more water. It is unusual that one of the final products, acetic acid, is also one of the chemicals used at the beginning of the process. Were there no mechanical loss of the acetic acid, it would serve as a regenerator for all succeeding lots of basic zinc carbonate manufacture. The process is therefore cyclic.

The action being completed, the contents of the reaction vessel are removed by pumping or other means, successively run through a battery of filters and washed, then dried and ground. The acetic acid filtrate and successively strengthened wash waters are to be reused for a succeeding lot of zinc oxide, as in the beginning of the process. The only loss is a small amount of acetic acid diluted in the washing, and any excess of carbon dioxide. The source of the carbon dioxide may be lime burning, fermentation, purified flue gas, or carbon dioxide obtained by any other means and stored in cylinders.

The basic zinc carbonate is formed in small opaque particles which have unusual covering power when ground in a drying oil and used as a paint. It has drying properties superior to zinc white. This seems to be owing to the hydroxide (hydrate) in it which probably saponifies the linseed or other drying oil, just as the hydroxide seems to do in corroded white lead. The two are analogous because each is a basic carbonate (hydrated carbonate). The basic zinc carbonate has the double advantage of having a superior covering power over white lead and in being free from the latter's poisonous qualities. Indeed, the basic zinc carbonate is used in pharmacy for plasters and ointments under the names zinc carbonate and zinci carbonas precipitatus. It may also be used as a face powder and as a filler for rubber.

It is to be understood that in this process, zinc hydroxide may be substituted for zinc oxide, using the same principles above described.

Various changes may be made in the details of the invention without departing from the essential features thereof as heretofore described or sacrificing any of the advantages set forth.

What I claim is:

1. The process of preparing basic zinc carbonate which comprises treating a basic oxygen-containing zinc compound other than a salt with carbon dioxide while suspended in a solution of a zinc salt of a water-soluble organic acid.

2. The process of preparing basic zinc carbonate which comprises treating a basic oxygen-containing zinc compound other than a salt with carbon dioxide while suspended in a solution containing a zinc salt of a water-soluble organic acid selected from the group consisting of formic, acetic, lactic and citric acids.

3. The process of preparing basic zinc carbonate which comprises suspending a zinc oxide in an aqueous solution of a zinc salt of a water-soluble organic acid, passing carbon dioxide into the suspension, and separating the resulting basic zinc carbonate from the suspension, and washing and drying said carbonate.

4. The process of preparing basic zinc carbonate which comprises suspending a zinc oxide in a solution of water-soluble organic acid with concomitant formation of the zinc salt thereof, passing into the resulting suspension carbon dioxide to convert the zinc oxide and zinc salt into a precipitate of basic zinc carbonate, separating said precipitate from the suspending liquor, and washing and drying the thus separated precipitate.

5. The process of preparing basic zinc carbonate from a zinc oxide, which comprises suspending the latter in a large excess of water containing a water-soluble organic acid capable of forming a water-soluble zinc salt, passing carbon dioxide into the resulting suspension under pressure, removing the resulting precipitate from the suspension, and washing and drying the precipitate.

6. The process of preparing basic zinc carbonate which comprises suspending a zinc oxide in a very dilute solution of a water-soluble organic acid selected from the group consisting of formic acid, acetic acid, lactic acid and citric acid; passing carbon dioxide into the resulting suspension to produce the basic zinc carbonate, separating the latter from the suspension, and washing and drying the said carbonate.

7. The process of preparing basic zinc carbonate which comprises suspending a zinc oxide in water, adding a small quantity of acetic acid, passing carbon dioxide into the resulting suspension, and filtering off the resulting precipitate and washing and drying the same.

8. The process of preparing basic zinc carbonate which comprises suspending a zinc oxide in water, converting a part of said zinc oxide into a salt of a water-soluble organic acid by adding such an acid to the suspension whereby by reaction between the zinc oxide and the organic zinc salt a basic zinc organic-acid salt will form, thereupon passing carbon dioxide through the resulting suspension with concomitant formation of basic zinc carbonate and liberation of an equivalent amount of the organic acid, filtering the resulting basic zinc carbonate from the suspension, and washing and drying the said carbonate, employing the filtrate for the suspension of further amounts of a zinc oxide so as to render the process a cyclic one.

9. The process as described in claim 8, wherein the organic acid is acetic acid.

MARTIN J. ENGBERG.